United States Patent
Ivov et al.

(10) Patent No.: US 10,887,359 B2
(45) Date of Patent: *Jan. 5, 2021

(54) PARALLEL PEER TO PEER CONNECTION ESTABLISHMENT IN WEBRTC CONFERENCING

(71) Applicant: Atlassian Pty Ltd, Sydney New South Wales (AU)

(72) Inventors: Emil Ivov, Austin, TX (US); Pawel Domas, Austin, TX (US)

(73) Assignee: ATLASSIAN PTY LTD., Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 16/837,128

(22) Filed: Apr. 1, 2020

(65) Prior Publication Data

US 2020/0228579 A1    Jul. 16, 2020

Related U.S. Application Data

(63) Continuation of application No. 15/635,019, filed on Jun. 27, 2017, now Pat. No. 10,630,739.

(51) Int. Cl.
| | |
|---|---|
| *G06F 15/16* | (2006.01) |
| *H04L 29/06* | (2006.01) |
| *H04L 29/08* | (2006.01) |
| *H04N 7/14* | (2006.01) |
| *H04N 7/15* | (2006.01) |

(52) U.S. Cl.
CPC ........ *H04L 65/403* (2013.01); *H04L 65/1069* (2013.01); *H04L 65/1093* (2013.01);
(Continued)

(58) Field of Classification Search
CPC .............. H04L 65/403; H04L 65/1069; H04L 65/1093; H04L 65/4076; H04L 65/80;
(Continued)

(56) References Cited

U.S. PATENT DOCUMENTS

| | | |
|---|---|---|
| 8,917,311 B1 | 12/2014 | Yang |
| 10,129,412 B1 | 11/2018 | Singh |

(Continued)

OTHER PUBLICATIONS

J. W. Jiang, M. Chiang, J. Rexford, S. -. G. Chan, K. -. S. Wong and C. -. P. Yuen, "Proxy-P2P Streaming under the Microscope: Fine-Grain Measurement of a Configurable Platform," 2010 Proceedings of 19th International Conference on Computer Communications and Networks, Zurich, 2010, pp. 1-6 (Year: 2010).*

(Continued)

*Primary Examiner* — Taylor A Elfervig
(74) *Attorney, Agent, or Firm* — Brownstein Hyatt Farber Schreck, LLP

(57) ABSTRACT

A method comprises establishing a video conference between at least two instances of a media application over a relay connection; in response to determining that the video conference comprises only two instances of the media application: receiving, from a first instance of the two instances of the media application, a plurality of candidate addresses for a peer to peer (P2P) connection with a second instance of the two instances of the media application; sending, to the second instance of the media application, the plurality of candidate addresses, wherein the P2P connection is established using a particular candidate address of the plurality of candidate addresses; after the P2P is established, maintaining the relay connection in an inactive state while media data for the video conference is sent over the P2P connection until a switch-over event occurs, wherein metadata is sent over the relay connection to keep the relay connection in the inactive state.

20 Claims, 5 Drawing Sheets

(52) U.S. Cl.
CPC .......... *H04L 65/4076* (2013.01); *H04L 65/80* (2013.01); *H04L 67/1053* (2013.01); *H04N 7/147* (2013.01); *H04N 7/148* (2013.01); *H04N 7/15* (2013.01); *H04N 7/152* (2013.01)

(58) Field of Classification Search
CPC .... H04L 67/1053; H04N 7/147; H04N 7/148; H04N 7/15; H04N 7/152
USPC ........................................................ 709/204
See application file for complete search history.

(56) References Cited

U.S. PATENT DOCUMENTS

| | | |
|---|---|---|
| 2011/0258338 A1 | 10/2011 | Vass |
| 2012/0259988 A1 | 10/2012 | Erringer |
| 2013/0028115 A1 | 1/2013 | Nerst |
| 2014/0241215 A1 | 8/2014 | Massover |

OTHER PUBLICATIONS

K. Matsushita, M. Nishimine and K. Ueda, "Cooperation P2P Web Proxy to Reduce Resource Usage," 2014 17th International Conference on Network-Based Information Systems, Salerno, 2014, pp. 420-425 (Year: 2014).*

L. Guo, S. Chen, S. Ren, X. Chen and S. Jiang, "PROP: a scalable and reliable P2P assisted proxy streaming system," 24th International Conference on Distributed Computing Systems, 2004. Proceedings., Tokyo, Japan, 2004, pp. 778-786 (Year: 2004).*

Guha R.K., Wang J.Z. (2002) Improving Web Access Efficiency Using P2P Proxies. In: Das S.K., Bhattacharya S. (eds) Distributed Computing. IWDC 2002. Lecture Notes in Computer Science, vol. 2571. Springer, Berlin, Heidelberg. (Year: 2002).*

Yoshimi et al., "NAT Traversal Technology of Reducing Load on Relaying Server for P2P Connections", dated 2007, 4th IEEE Consumer Communications and Networking Conference, dated 2007, pp. 100-104.

Widmer, Christopher "NAT Traversal Techniques and UDP Keep Alive Interval Optimization", dated Jul. 2015, pp. 1-175.

Ford et al, "Peer to Peer Communication Across Network Address Translators", dated 2005, USENIX, pp. 1-14.

Ivov, U.S. Appl. No. 15/635,019, filed Jun. 27, 2017, Office Action, dated Oct. 9, 2019.

Ivov, U.S. Appl. No. 15/635,019, filed Jun. 27, 2017, Office Action, dated Apr. 17, 2019.

Ivov, U.S. Appl. No. 15/635,019, filed Jun. 27, 2017, Notice of Allowance, dated Dec. 27, 2019.

* cited by examiner

PARALLEL PEER TO PEER CONNECTION ESTABLISHMENT IN WEBRTC CONFERENCING

BENEFIT CLAIM

This application claims the benefit under 35 U.S.C. § 120 as a Continuation of application Ser. No. 15/635,019, filed Jun. 27, 2017, the entire contents of which is hereby incorporated by reference for all purposes as if fully set forth herein.

FIELD OF THE DISCLOSURE

The technical field of the present disclosure generally relates to improved methods, computer software, and/or computer hardware in telecommunication conferencing. More specifically, the present disclosure relates to computer-implemented techniques for peer to peer connection establishment in conferences.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video and audio calls and conferences are becoming both more common and larger in size every day. Originally, video calls, audio calls, and conferences hosted using computers were limited to direct connections between users in which a first user called a second user, enabling the users to see and hear each other during the call. As methods improved, conferences of five, ten, or more users all with streaming video and audio became more common. Simply sending all video and audio data from each participant to every other participant in such a large conference often is not feasible due to limitations on network bandwidth in local area networks and internetworks and the limited processing power in some client computing devices.

In response, solutions to large video and audio conferences were implemented with media servers using two general approaches: multipoint control units (MCU) and selective forwarding units (SFU). MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing.

Although the use of media servers offers many advantages, there are inefficiencies introduced through their use. The inefficiencies are varied and impact the energy, computing power, and/or bandwidth needed to run a conferencing system. Improvements in efficiency of conferencing systems that use media servers are needed.

DETAILED DESCRIPTION

Figure 1:
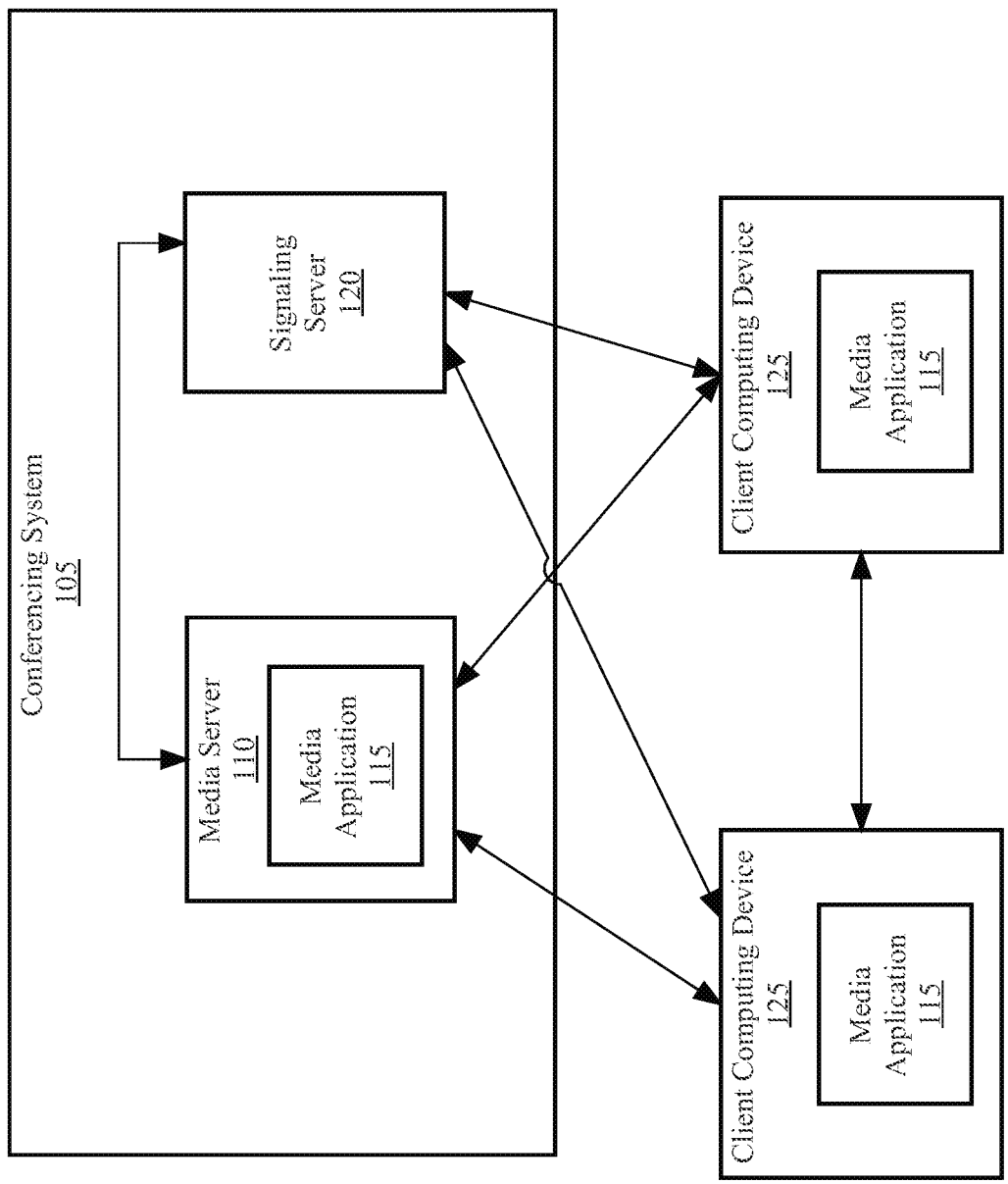
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. OVERVIEW
2. EXAMPLE COMPUTER SYSTEM IMPLEMENTATION
3. EXAMPLE FUNCTIONAL IMPLEMENTATION
4. EXAMPLE PEER TO PEER CONNECTION ESTABLISHMENT IN CONFERENCES
5. HARDWARE OVERVIEW

1. Overview

Computer-implemented techniques are provided for peer to peer connection establishment in conferences. In various embodiments, a video or audio conference is established using a media server. The conference is set up such that any number of participants may join the conference. When two client computing devices join the conference, the media server provides a relay connection over which the two client computing devices may communicate. In other words, for client A to send video and/or audio data to client B, the video and/or audio data is sent to the media server first, and the media server then forwards or sends the video and/or audio data on to client B. When there are only two participants in a conference, which is frequently the case, this is inefficient. Instead, the two participants may be better served connected directly using a peer to peer connection and not using the relay connection. However, since the conference is setup such that other participants may join at any time, simply switching to a peer to peer connection is not possible.

Thus, after or as a video or audio conference is established, a determination is made whether there are only two participants. If there are only two, the client computing devices gather candidate addresses for a peer to peer (P2P) connection, and send the candidate addresses to the other client computing device. The candidate addresses do not include the relay connection or media server, because that connection is already active and used for the video conference. Once a P2P connection is made using a candidate address, the relay connection is set to inactive, and media data for the conference is no longer sent over the relay connection. Instead, media data for the conference is now sent using the P2P connection. Metadata is periodically sent over the relay connection to ensure that the connection is not closed and so that an additional participant may join the conference. When an additional participant joins the conference, the relay connection is set to active, media data for the conference is sent using the relay connection, and the P2P connection is closed. Likewise, if the conference returns to only two participants, such as when a third participant leaves, the process of establishing a P2P connection may be repeated.

The embodiments described herein may utilize many different standards and formats. Familiarity with aspects of various Requests for Comment (RFCs) published by the Internet Society or Internet Engineering Task Force is presumed for purposes of understanding the present disclosure. These include: Interactive Connectivity Establishment (ICE) defined in RFC 5245 and Session Description Protocol (SDP) defined in RFC 4566. Further, familiarity with Web Real-Time Communication (WebRTC), definition available from the World Wide Web Consortium (W3C), is also presumed for purposes of understanding the present disclosure. The reader and user of the present disclosure is presumed to possess copies of and to understand RFC 5245, RFC 4566, and WebRTC, and to have a sufficient level of knowledge and skill to apply RFC 5245, RFC 5389, and/or WebRTC to computer(s) in a network.

In one embodiment, a computer implemented method comprises using a media server, establishing a video conference between a first instance of a media application and a second instance of the media application over a relay connection, in response to determining that the video conference comprises only the first instance and the second instance of the media application, determining by the first instance of the media application a plurality of candidate addresses for a peer to peer (P2P) connection with the second instance of the media application, the plurality of candidate addresses excluding the media server, sending the plurality of candidate addresses to the second instance of the media application, establishing the P2P connection using a particular candidate address of the plurality of candidate addresses, in response to establishing the P2P connection, setting the relay connection to an inactive state and sending media data for the video conference over the P2P connection.

Other embodiments, aspects and features will become apparent from the disclosure as a whole.

2. Example Computer System Implementation

FIG. 1 illustrates a system in which the techniques described may be practiced, according to one embodiment. In an embodiment, conferencing system 105 comprises components that are implemented at least partially by hardware at one or more computing devices, such as media servers 110, or one or more hardware processors, executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates conferencing system 105, media server 110, media application 115, signaling server 120, and client computing device 125. Conferencing system 105 may execute on any computing device or devices, including but not limited to: servers, racks, work stations, personal computers, general purpose computers, laptops, Internet appliances, wireless devices, wired devices, multi-processor systems, mini-computers, and the like. Although FIG. 1 shows conferencing system 105 as a single element, conferencing system 105 broadly represents one or multiple computing devices, and may be located in one or more physical locations. Conferencing system 105 also may represent one or more virtual computing instances that execute using one or more computers in a datacenter such as a virtual server farm. Conferencing system 105 may be connected through any kind of computer network using any combination of wired and wireless communication, including, but not limited to: a Local Area Network (LAN), a Wide Area Network (WAN), one or more internetworks such as the public Internet, or a company network.

Generally speaking, conferencing system 105 provides conferencing services to any client computing device that connects to the conferencing system and acts as a bridge or relay for enabling the participants to communicate. The conferences may be video conferences, audio conferences, a combination thereof, or any other type of conference. The size of the conference may be from two participants to hundreds of participants or more. During a conference, connected client computing devices send media data to conferencing system 105, and conferencing system 105 directs the media data to the other participants as needed. The media data may include video data, audio data, or a combination thereof. Additional details of the components and functionalities of conferencing system 105 is discussed below.

Media server 110 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although FIG. 1 shows media server 110 as an individual device, media server 110 may be multiple devices, such as a server cluster, and may be located in one or more physical locations. Media server 110 may host or execute a media application 115, and may include other applications, software, and other executable instructions to facilitate various aspects of embodiments described herein.

In one embodiment, media server 110 may be a selective forwarding unit (SFU) or multipoint control units (MCU) used for audio or video conferencing. MCUs receive and process audio and video data from clients and typically mix the audio and video to create a single composite video. The composite video is then streamed to clients in a single mix. While this solution enables relatively simple client software, the processing power needed for the MCU is high, and the resulting presentation at the client is generally inflexible. SFUs, in contrast, are more similar to packet data routers, as SFUs forward packets without media processing. Although a single media server is shown in FIG. 1, any number of media servers may be used, such as two, ten, or more. When more than one media server 110 is used, the media servers 110 may be organized or arranged in any fashion, such as a full mesh topology, where each media server communicates with each other media server, or a hierarchy, where each media server has a parent and/or child media server with which it communicates. Media server 110 is communicatively connected to signaling server 120, and/or client computing devices 125 through any kind of computer network using any combination of wired and wireless communication, including, but not limited to: a LAN, a WAN, the Internet, or a company network. Media server 110 executes media application 115. Media application 115 is discussed in detail below.

Signaling server 120 is a signaling server used for initiating conferences. Signaling server 120 may be any computing device, and may execute one or more applications (not shown) to provide the functionality needed for the embodiments described herein. Signaling server 120 may use Session Initiation Protocol (SIP), Extensible Messaging and Presence Protocol (XMPP), Jingle, and/or any other suitable protocol to assist in establishing a conference. As part of initiating a conference, signaling server 120 may receive requests from client computing devices, and determine a media server with which to connect the client computing device. The determination may be based on the load of the media server, the location of a particular media or data item the client wishes to access (such as a media server hosting an audio or video conference), or any other basis. Signaling server 120 may perform any other functionalities as needed to aid in the embodiments described herein.

Conferencing system 105 may also include additional components that are not shown in FIG. 1, such as a proxy, router, or other device through which media servers 110 may be accessed. The proxy, router, or other device may provide Network Address Translation (NAT) or other functionalities as needed by conferencing system 105. Conferencing system 105 may also include a data store, database, or other storage devices to store any digital electronic data as needed by conferencing system 105. Further, conferencing system 105 may include any other suitable component.

In one embodiment, client computing devices 125 may be any computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although two client computing devices 125 are shown in FIG. 1, any number of client computing devices may be present. Client computing devices 125 are communicatively connected to signaling server 120 and/or a media server 110 through any kind of computer network using any combination of wired and wireless communication, including, but not limited to: a LAN, a WAN, the Internet, or a company network, and may connect directly to other client computing devices 125 using a P2P connection while participating in a video conference using the methods described herein. Client computing devices 125 may include applications, software, and other executable instructions to facilitate various aspects of embodiments described herein. In one embodiment, client computing devices 125 include client software that is programmed to support video conferencing or audio conferencing, such as media application 115.

Media server 110 and/or client computing devices 125 may execute media application 115. In some embodiments, other components may execute media application 115 or portions thereof, as needed. Media application 115 is a media application for conferencing. Media application 115 may be available in multiple versions, such as a version for servers and a client version. The client version of media application 115 may be thin-client and accessed through a web browser, or may be thick-client. The server version may be installed and used by a specific company or entity, may be offered over the public Internet via a web browser, or may be part of a Software as a Service (SaaS) implementation where entities sign up for access to the conferencing service. Regardless of which version of media application 115 is in use, the functionalities provided may be the same, although the distribution of work or actions performed by a given media application may vary based on configuration details or the versions used.

Media application 115 is programmed or configured to establish a conference with multiple client computing devices 125. The conference may be an audio or video conference, and the conference may be established using any format or manner. For example, Interactive Connectivity Establishment (ICE) and Web Real-Time Communication (WebRTC) may be used. The client computing devices 125 may connect to media server 110 in any suitable manner. If multiple media servers 110 are used, the client computing devices may connect in any configuration or distribution. For example, one media server may have three client computing devices connected while another media server has one client computing device connected. When establishing the conference a relay connection is used. A relay connection connects client computing devices using a relay, such as a media server. This is in contrast to a P2P, or direct, connection between client computing devices. Optionally, the P2P connection may be established in parallel with establishing the conference.

Media application 115 is programmed or configured to send and receive media to and from media servers and client computing devices. The media data may be sent in any format or manner, and may include video data, audio data, or video and audio data. The media data may be sent over a relay connection when media server 110 is used, or over a P2P connection when only two client computing devices 125 are in a conference.

Media application 115 is programmed or configured to determine the number of participants in a conference. The number of participants, or client computing devices, in a conference may be determined by a media server 110 of the conference in any suitable manner. Once known, the number of participants may be sent to the participant client computing devices.

Media application 115 is programmed or configured to gather candidate addresses for a P2P connection. The gathering of candidate addresses occurs on each client computing device 125 for which a P2P connection is attempting to be established. Of the two client computing devices 125 involved in a P2P connection, one of the client computing devices initiates the gathering of candidate addresses, such as the client computing device with the smaller lexicographical ID in the conference. Alternatively, any other attribute or factor may be used. Candidate addresses are addresses where the client computing device 125, and thus a media application 115, may be possibly be reached, and therefore a P2P connection may possibly be opened. The candidate addresses are not guaranteed to work. Rather, the candidate addresses are merely addresses that should be tried when attempting to establish a connection. The candidate addresses may be of any form, such as IP address and port number pairs. The candidate addresses do not include media server 110, as a relay connection is already established with the media server. Typically, the candidate addresses do not include any relay candidate addresses, although the candidate addresses may optionally include a turn server or other relay that is not the media server.

Media application 115 is programmed or configured to exchange candidate addresses for a P2P connection. The exchange involves the media application 115 of each client computing device 125 sending the candidate addresses to the other client computing device through the relay connection. Thus, the media application 115 of each client computing device 125 also receives candidate addresses from the other client computing device. Media application 115 is programmed or configured to establish a P2P connection and send and receive media data for the conference over the established P2P connection. The P2P connection may be established in any manner, using any combination of candidate addresses. Media application 115 may attempt connections using any combination of candidate addresses until a connection is successful. Media application 115 may send and receive media data over the P2P connection in any manner using any format.

Media application 115 is programmed or configured to determine whether a P2P connection satisfies a threshold value. The threshold value may be used to determine when to switch from a relay connection to a P2P connection. For example, if the round trip time (RTT) of the P2P connection is longer than the RTT using the relay connection, then the quality of the conference will likely decrease when using the P2P connection over the relay connection. Thus, a threshold value may be used to determine if the conference should switch from the relay connection to the P2P connection. The threshold value may be set to any amount by any suitable entity such as a user, administrator, or programmer, and may be based on any factor or attribute, such as a latency, a download speed, an upload speed, a RTT, etc.

Media application 115 is programmed or configured to set an inactive or active state for the relay connection, and keep the relay connection alive. Initially, upon establishing the conference, media application 115 sets the relay connection state to active while media data is being sent over the relay connection. However, in response to establishing a P2P connection, the relay connect is set to an inactive state. When in the inactive state, no media data is sent over the relay connection. Instead, a limited amount of metadata or other data needed to keep the connection alive is sent. By keeping the relay connection alive, media application 115 may rapidly resuming using the relay connection, such as when an additional participant joins the conference. Media application 115 may switch the relay connection from an active state to an inactive state, and from an inactive state to an active state any number of times, and in response to any factors. For example, media application 115 may change the state from inactive to active in response to a quality of the P2P connection degrading below a threshold value.

3. Example Functional Implementation

Figure 2:
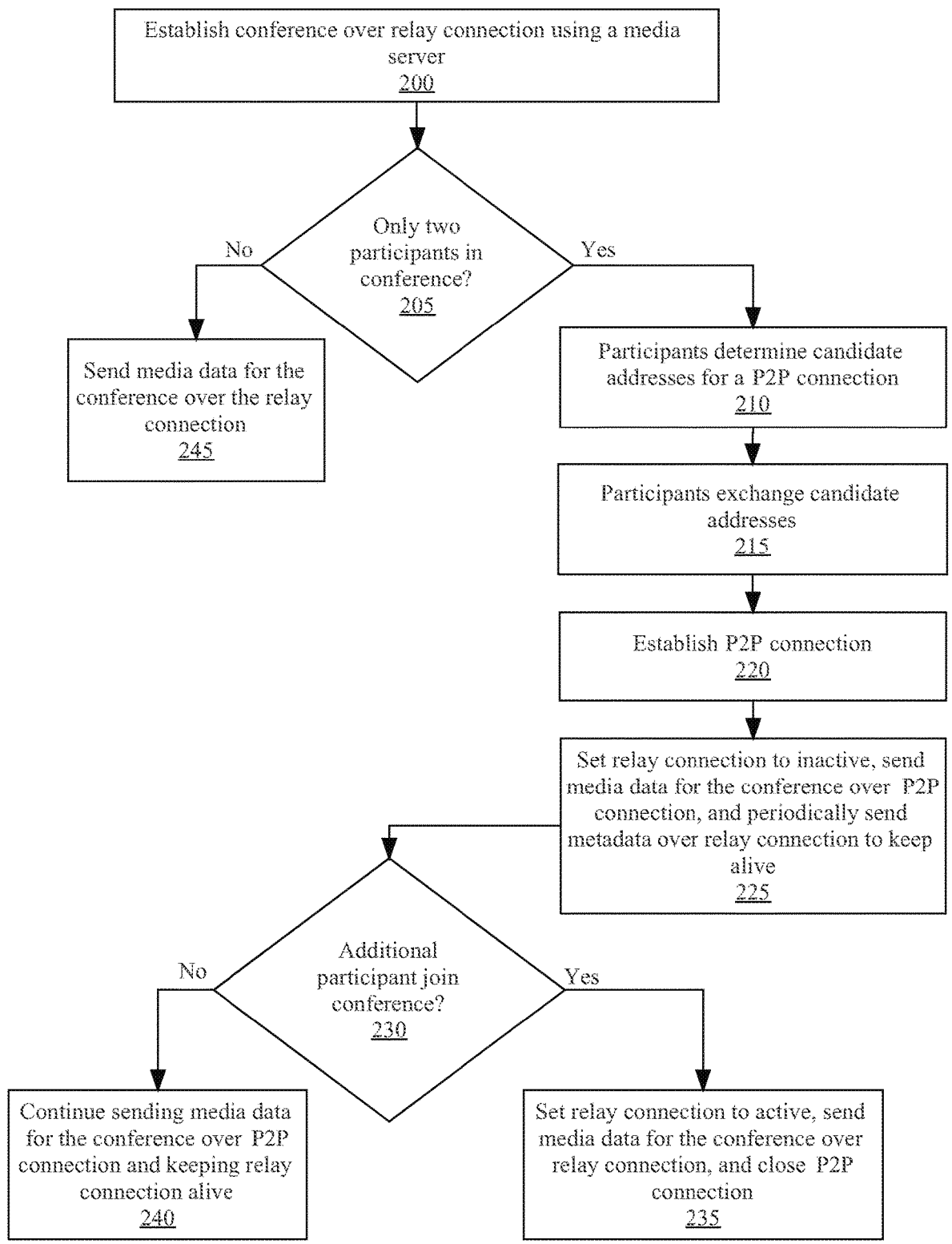
FIG. 2 illustrates a programmable algorithm or method for peer to peer connection establishment in conferences in accordance with an embodiment.

FIG. 2 illustrates an example programmable algorithm or method for peer to peer connection establishment in conferences. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a conference is established using a media server and a relay connection. The conference may be established using any format or method. Any number of client computing devices may connect to the conference, using any kind or type of device. The client devices connect to a media server, and send and receive media data for the conference over the relay connection via the media server. Optionally, steps 200 and step 205 may be performed in parallel.

In step 205, a determination is made whether there are only two participants in the conference. The determination may be made in any manner, such as using identifiers provided from a signaling server, tracking a number of data streams or open connections, or any other method. Any suitable component may make the determination, such as a signaling server or client computing device. Optionally, steps 200 and step 205 may be performed in parallel. If there are not two participants in the conference, the method proceeds to step 245. If there are two participants in the conference, the method proceeds to step 210.

In step 210, participants determine candidate addresses for a P2P connection. The candidate addresses may be gathered in any manner. The candidate addresses may include any data need for establishing a P2P connection, such as IP address and port number. The candidate addresses do not include any relay connection candidates because there is already a relay connection established between the participants, as discussed in step 200. Thus, only candidate addresses for a direct P2P connection are gathered. Step 210 is performed by both participants, although the participants may perform step 210 at slightly different times. For example, one participant may perform step 210 in response to determining there are two participants, while the other participant may perform step 210 in response to receiving candidate addresses from the first participant, as discussed in step 215.

In step 215, participants exchange candidate addresses. To exchange candidate addresses, each client computing device sends gathered candidate addresses to the other client computing device through the relay connection. Likewise, each client computing device receives candidate addresses from the other client computing device through the relay connection. The candidate addresses may be sent in any format or manner and at any time.

In step 220, a P2P connection is established. The P2P connection may be established in any manner, using any combination of candidate addresses. Any number of connections may be attempted using any combination of candidate addresses until a connection is successful.

In step 225, the relay connection is set to inactive, and media data for the conference is sent over the P2P connection. Further, metadata is occasionally sent over the relay connection to keep the relay connection alive. Optionally, the relay connection is set to inactive after a short delay, such as a few seconds, so that state changes are less frequent. Further, a threshold may be used to determine if a state change should happen, such as checking a latency of the P2P connection to ensure that the quality of the conference via the P2P connection will be the same or better than with the relay connection. The relay connection may be set to an inactive state using any method. Once in the inactive state, media data for the conference is no longer sent over the relay connection. Instead, media data is sent over the P2P connection. However, metadata is periodically sent over the relay connection to keep the relay connection alive. By keeping the relay connection alive, the conference may rapidly be switched back to using the relay connection when needed.

In step 230, a determination is made whether another participant has joined the conference. The determination may be made by a media server in any manner, and at any time. If an additional participant has not joined the conference, the method proceeds to step 240. If an additional participant has joined the conference, the method proceeds to step 235.

In step 235, the relay connection is set to active, media data for the conference is sent over the relay connection, and the P2P connection is closed. The relay connection is set back to active because an additional participant has joined. Media data may for the conference may be sent over the relay connection in any manner. There may be a short delay, such as 3 seconds, before the media data is sent over the relay connection to ensure a smooth transition. The P2P connection is closed because there are three or more participants, and the P2P connection is no longer needed.

In step 240, media data is sent over the P2P connection, and the inactive relay connection is kept alive. The media data may be sent over the P2P connection in any manner, and any type of metadata may be sent over the relay connection to keep the relay connection alive.

In step 245, media data for the conference is sent over the relay connection. As discussed above, the media data may be in any format and may be sent in any manner.

Using this process, a conferencing system may save substantial amounts of bandwidth, power, and processing time. In an embodiment, for example, every conference is a conference; that is, each conference by default includes the ability to support three or more participants. This provides benefits when three or more participants are expected. However, when there are only two participants, which typically represents a large amount of conferences, this is inefficient. By allowing conferences of two participants to establish a P2P connection after a relay connection has been established, and to send media data for the conference over the P2P connection, the conferencing system does not have to expend any bandwidth, power, or processing time on that media data. By keeping the relay connection alive, but in an inactive state, the conferencing system is able to accept an additional participant and quickly switch the conference back to using the relay connection by changing the state of the relay connection. This ensures that the transition back to the relay connection is quick and smooth without the usual startup time needed to establish a new connection. Consequently, embodiments as described provide distinct technical benefits by using less memory or storage, fewer CPU cycles and less network bandwidth to accommodate two-party conferences.

4. Example Peer to Peer Connection Establishment in Conferences

Figure 3B:
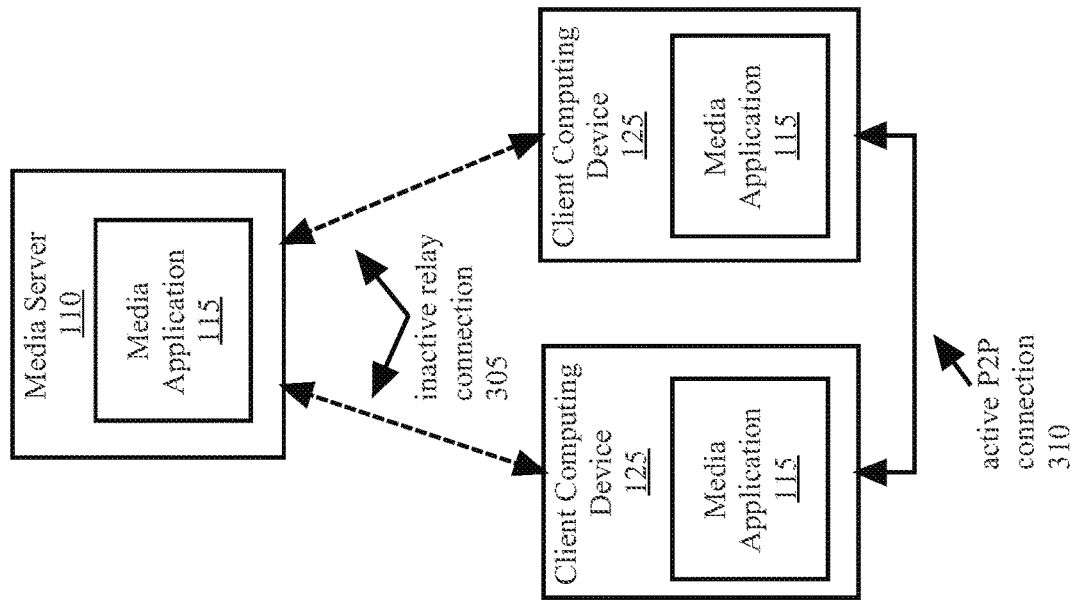
FIG. 3A, FIG. 3B, and FIG. 3C illustrate an example of peer to peer connection establishment in conferences.
Figure 3A:
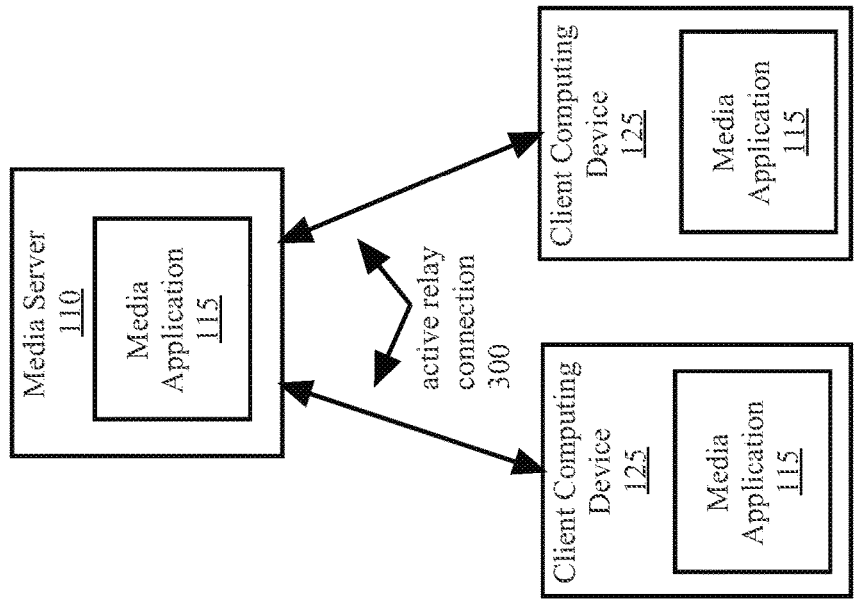
Figure 3C:
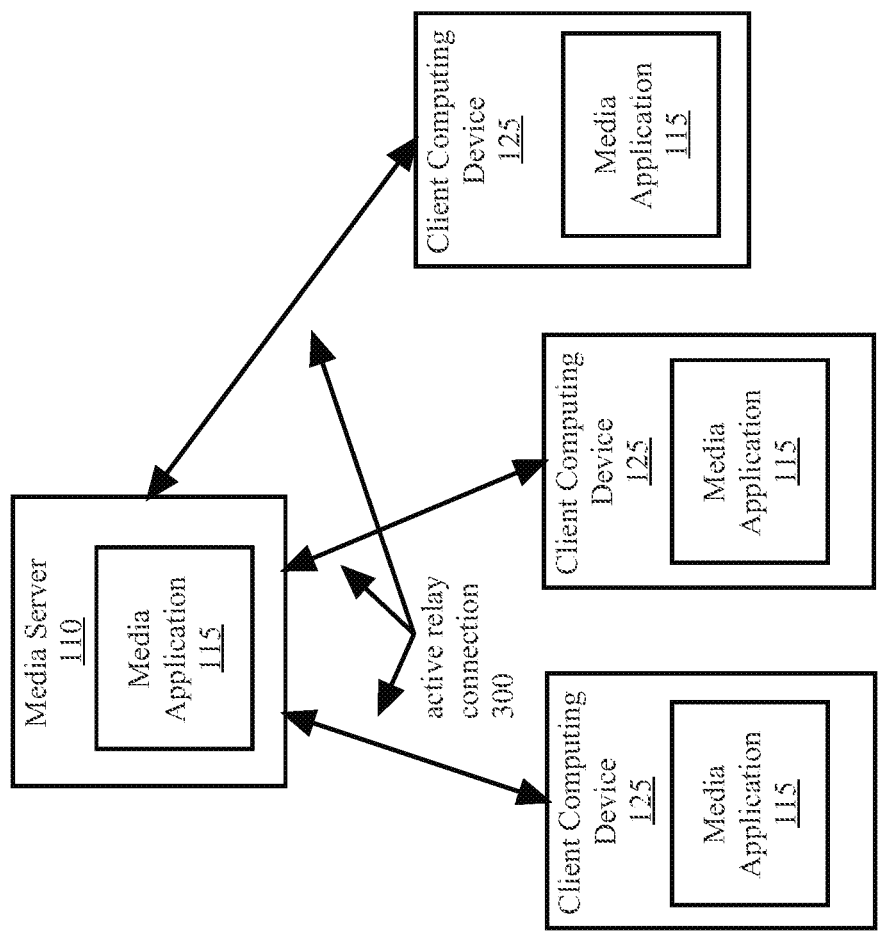

FIG. 3A, FIG. 3B, and FIG. 3C illustrate an example of peer to peer connection establishment in conferences in accordance with an embodiment.

Referring first to FIG. 3A, a conference has been established between two client computing devices 125. The client computing devices 125 are using active relay connection 300 and media server 110 to communicate with each other for the conference. Upon determining that there are only two client computing devices in the conference, one or both of the client computing devices gather candidate addresses for establishing a P2P connection with the other client device. The gathered addresses may include any potential address where the client computing device may be able to establish a direct, P2P connection. Relay candidates, such as addresses that use a relay or media server for communication, are not included because active relay connection 300 is already established and is currently in use for the conference. The client computing devices 125 exchange the gathered candidate addresses by sending/receiving the candidate addresses in any manner or format. Once received, P2P connections are attempted using combinations of the candidate addresses. At this point, the example continues in FIG. 3B.

In FIG. 3B, the active P2P connection 310 has been established. This connection allows the client computing devices 125 to communicate media data for the conference directly. Once the active P2P connection 310 was established, the relay connection was set to an inactive state, resulting in inactive relay connection 305. No media data for the conference is sent over inactive relay connection 305. Rather, any media data for the conference is sent over active P2P connection 310. However, metadata or other data needed to maintain the relay connection is sent via inactive relay connection 305 as needed. By setting the connection to inactive and keeping the connection alive, the conference may accept a third participant and rapidly switch back to using the relay connection.

In FIG. 3C, a third client computing device 125 has connected to, and joined, the conference via media server 110. In response to this, the state of the relay connection was switched back to active, and media data for the conference was again sent via the relay connection, resulting in active relay connection 300. In addition, the P2P connection was closed.

Using an embodiment, substantial savings in bandwidth, power, and computing time may be had. These savings come from utilizing a direct, P2P connection between conference participants when there are only two participants in a conference. Additionally, the ability to quickly accept additional participants to the conference is maintained by keeping the relay connection with the server alive, and switching back to the relay connection when another participant joins the conference. Optionally, if the quality of the P2P connection degrades, or for any other suitable reason, the conference may be switched back to the relay connection even if there are only two participants, to ensure the quality of the conference.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
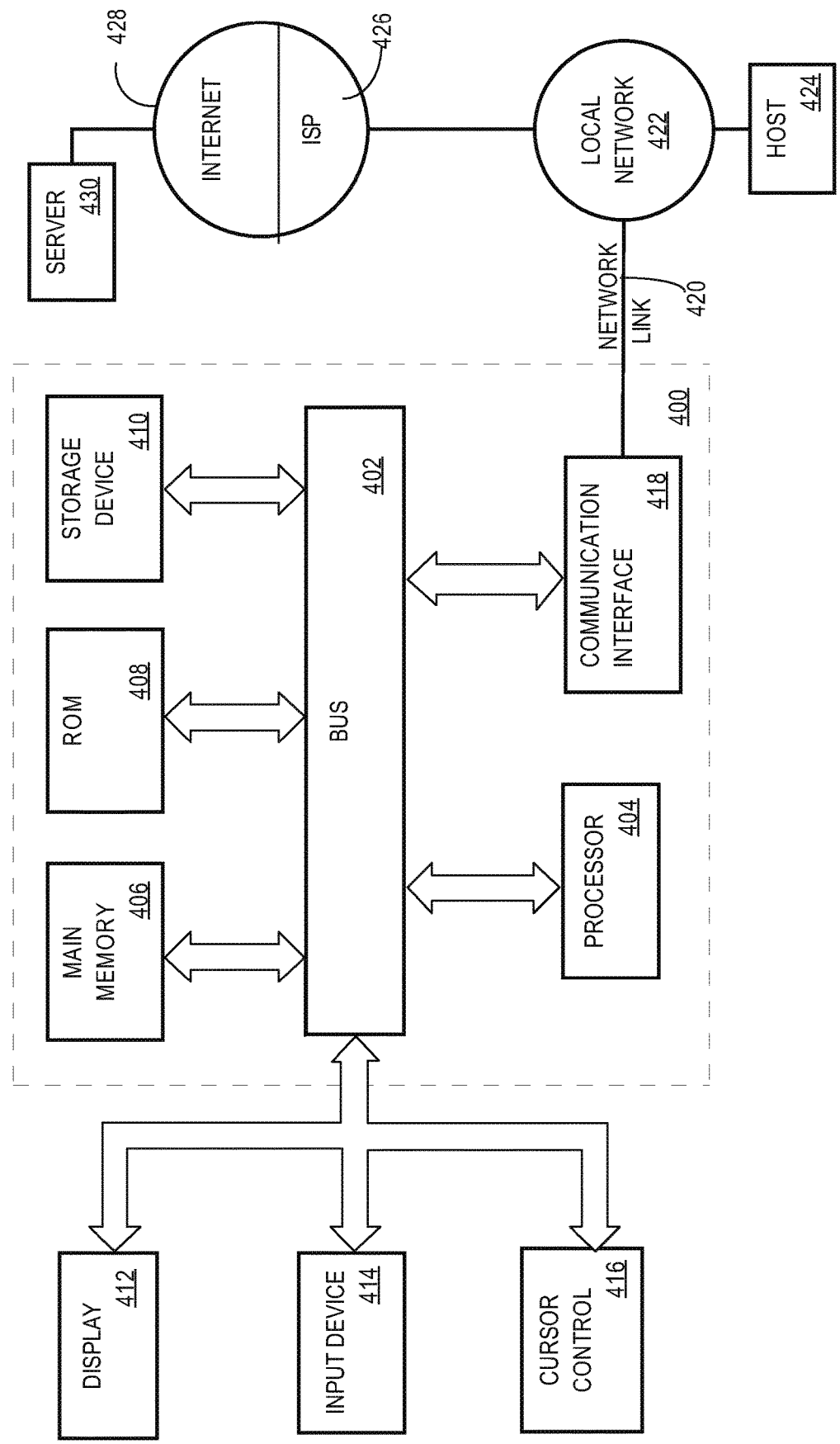
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   establishing a video conference between at least two instances of a media application over a relay connection;
   in response to determining that the video conference comprises only two instances of the media application:
   receiving, from a first instance of the two instances of the media application, a plurality of candidate addresses for a peer to peer (P2P) connection with a second instance of the two instances of the media application;
   sending, to the second instance of the media application, the plurality of candidate addresses, wherein the P2P connection is established using a particular candidate address of the plurality of candidate addresses;
   after the P2P is established, maintaining the relay connection in an inactive state while media data for the video conference is sent over the P2P connection until a switch-over event occurs, wherein metadata is sent over the relay connection to keep the relay connection in the inactive state.

2. The method of claim 1, wherein the switch-over event is when a third instance of the media application joins the video conference.

3. The method of claim 2, further comprising in response to the third instance of the media application joining the video conference, keeping the relay connection alive but in an active state such that the media data for the video conference is sent over the relay connection, wherein the P2P connection is closed.

4. The method of claim 1, wherein the P2P connection is established when one or more attributes of the P2P connection satisfy a quality level.

5. The method of claim 4, wherein one of the one or more attributes is round trip time.

6. The method of claim 4, wherein the switch-over event is when the one or more attributes of the P2P connection do not satisfy the quality level.

7. The method of claim 1, wherein the first instance of the media application executes on a first client computing device, and wherein the second instance of the media application executes on a second client computing device.

8. The method of claim 1, wherein the video conference uses Web Real Time Communication (WebRTC).

9. The method of claim 1, wherein the video conference uses Interactive Connectivity Establishment (ICE).

10. A computer system comprising:
    a media server comprising one or more processors and one or more memories storing one or more sequences of instructions which, when executed by the one or more processors, cause the one or more processors to perform:
    establishing a video conference between at least two instances of a media application over a relay connection;
    in response to determining that the video conference comprises only two instances of the media application:
    receiving, from a first instance of the two instances of the media application, a plurality of candidate addresses for a peer to peer (P2P) connection with a second instance of the two instances of the media application;
    sending, to the second instance of the media application, the plurality of candidate addresses, wherein the P2P connection is established using a particular candidate address of the plurality of candidate addresses;
    after the P2P is established, maintaining the relay connection in an inactive state while media data for the video conference is sent over the P2P connection until a switch-over event occurs, wherein metadata is sent over the relay connection to keep the relay connection in the inactive state.

11. The system of claim 10, wherein the switch-over event is when a third instance of the media application joins the video conference.

12. The system of claim 11, wherein the one or more sequences of instructions which, when executed by the one or more processors, cause the one or more processors to further perform in response to the third instance of the media application joining the video conference, keeping the relay connection alive but in an active state such that the media data for the video conference is sent over the relay connection, wherein the P2P connection is closed.

13. The system of claim 10, wherein the P2P connection is established when one or more attributes of the P2P connection satisfy a quality level.

14. The system of claim 13, wherein one of the one or more attributes is round trip time.

15. The system of claim 13, wherein the switch-over event is when the one or more attributes of the P2P connection do not satisfy the quality level.

16. The system of claim 10, wherein the first instance of the media application executes on a first client computing device, and wherein the second instance of the media application executes on a second client computing device.

17. The system of claim 10, wherein the video conference uses Web Real Time Communication (WebRTC).

18. The system of claim 10, wherein the video conference uses Interactive Connectivity Establishment (ICE).

19. One or more non-transitory machine-readable storage media storing one or more sequences of program instructions which, when executed by one or more computing devices, cause performing:
    establishing a video conference between at least two instances of a media application over a relay connection;

in response to determining that the video conference comprises only two instances of the media application:
  receiving, from a first instance of the two instances of the media application, a plurality of candidate addresses for a peer to peer (P2P) connection with a second instance of the two instances of the media application;
  sending, to the second instance of the media application, the plurality of candidate addresses, wherein the P2P connection is established using a particular candidate address of the plurality of candidate addresses;
after the P2P is established, maintaining the relay connection in an inactive state while media data for the video conference is sent over the P2P connection until a switch-over event occurs, wherein metadata is sent over the relay connection to keep the relay connection in the inactive state.

20. The one or more non-transitory machine-readable storage media of claim 19, wherein the switch-over event is when a third instance of the media application joins the video conference or when one or more attributes of the P2P connection do not satisfy a quality level.

\* \* \* \* \*